UNITED STATES PATENT OFFICE.

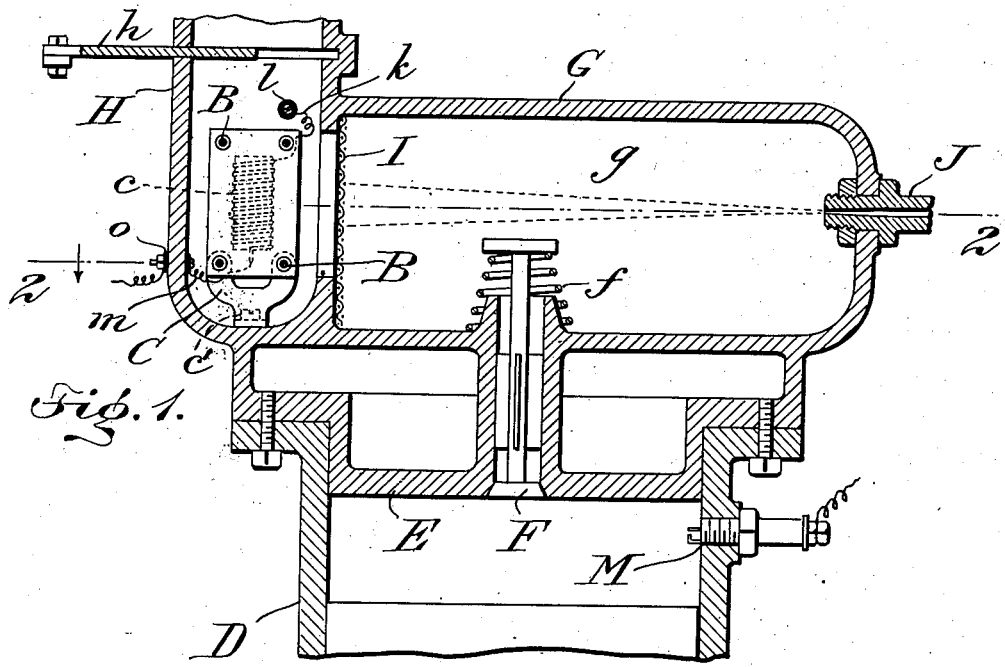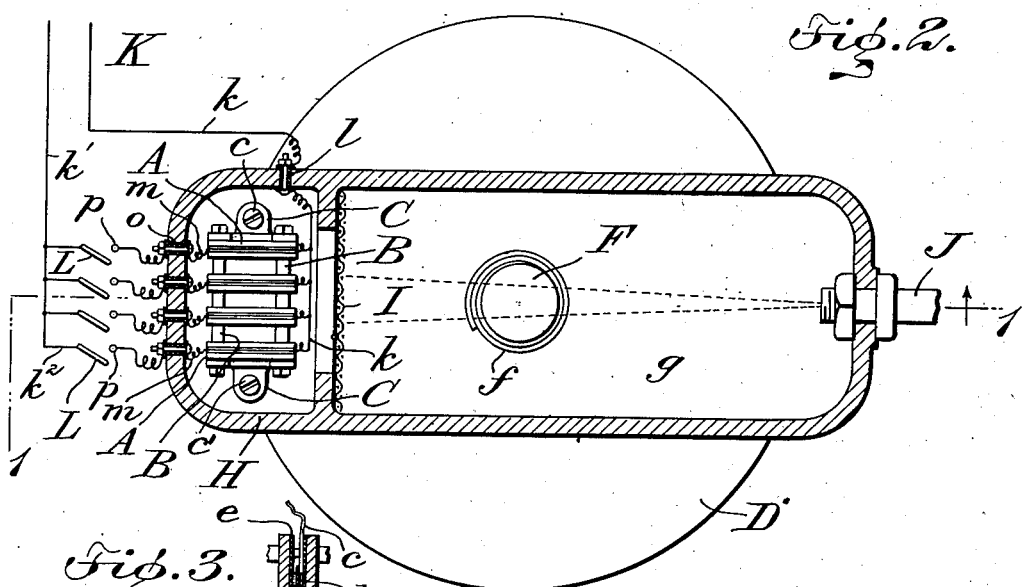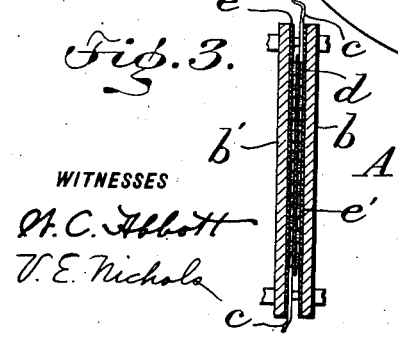

HARRY HERTZBERG, OF NEW YORK, AND ABBOT A. LOW, OF HORSESHOE, NEW YORK; SAID HERTZBERG ASSIGNOR TO SAID LOW.

ELECTRICALLY-HEATED STARTING-VAPORIZER FOR INTERNAL-COMBUSTION ENGINES.

No. 909,900.           Specification of Letters Patent.           Patented Jan. 19, 1909.

Original application filed February 11, 1907, Serial No. 356,792. Divided and this application filed April 16, 1907. Serial No. 368,555.

*To all whom it may concern:*

Be it known that we, HARRY HERTZBERG and ABBOT AUGUSTUS LOW, citizens of the United States, residing at the city of New York, borough of Brooklyn, State of New York, and Horseshoe, St. Lawrence county, State of New York, respectively, have invented a certain new and useful Electrically-Heated Starting-Vaporizer for Internal-Combustion Engines, of which the following is a specification.

This invention is a vaporizer especially adapted to be used for starting an internal combustion engine, the latter being adapted to employ a liquid combustible, such as kerosene, for the purpose of starting the engine and for thereafter continuing the operation of said engine, whereby it is necessary to use one kind of fuel only in the engine.

The subject matter of this application is a division of a prior application filed by us on the 11th day of February, 1907, Serial No. 356,792, wherein we have shown and described various forms of starting vaporizers, each of which embodies the same generic features of a mass of heat-absorbing metal and an electrically operated heater incased by said mass and adapted to heat the same to a temperature requisite for converting a combustible liquid into a vapor, which vapor is adapted to be ignited in a piston cylinder for the purpose of furnishing the energy required for the operation of the engine when starting the same.

In the present application the heater consists of a plurality of units, each composed of a mass of heat absorbing metal and electrically operated heating means incased within said mass of metal. Said units are arranged for a liquid combustible to strike or impinge upon the surfaces presented by the heated metallic masses, whereby the liquid is converted into a vapor, which vapor, in the preferred form of the invention, is adapted to be mixed with atmospheric air for the purpose of producing a charge adapted to be ignited in a piston cylinder. Said electrically-heated metallic masses may be included in series or in multiple in the electric circuit, and provision is made, preferably, for switching the units individually into and out of the electric circuit, whereby the effective area of the vaporizer may be varied and changed (either increased or diminished) as circumstances may require or the exigencies of the case demand.

In the accompanying drawings, we have illustrated one practical embodiment of the invention, but the construction shown therein is to be understood as illustrative only, and not as defining the limits of the invention.

Figure 1 is a vertical section illustrating our starting vaporizer in connection with one type of internal combustion engine, the plane of the section being indicated by the dotted line 1—1 of Fig. 2 looking in the direction of the arrow. Fig. 2 is a horizontal section on the line 2—2 of Fig. 1. Fig. 3 is a detail view in cross section of one unit employed in our starting vaporizer.

The starting vaporizer of our invention consists of a plurality of units, A, which are spaced with relation to one another, preferably in the parallel order shown in Fig. 2 of the drawings. Each unit is composed of a mass of metal, and electrically operated means incased within said mass for heating the same, substantially as shown in Fig. 3 of the drawings. The mass of metal is represented as parallel plates, $b$, $b'$, of copper or other metal adapted to absorb the heat developed by an electrical resistance when a current passes through said resistance. In Figs. 1 and 3 of the drawings, said electrical resistance is represented as a thin or attenuated metallic wire or ribbon, $c$, but it will be understood that we may substitute for this metallic wire or ribbon any equivalent material, such as a carbon resistance. In the embodiment of the invention shown, however, the wire or ribbon is coiled or wrapped on a core, $d$, which consists, preferably, of a thin layer of insulating material, such as mica. The core, $d$, of insulating material serves to electrically insulate one side of the winding from the other side thereof, said winding being flat as shown in the drawings. The core with the electrical resistance wound thereon is placed between the parallel plates, $b$, $b'$, of the vaporizer unit, and said resistance wire or ribbon is insulated electrically from the metallic plates, $b$, $b'$, by interposed layers, $e$, $e'$, of insulating material, such as mica. By reference to Fig. 3 it will be seen that the resistance wire or ribbon is, practically, in mechanical contact with the adjacent plates, b, b', although said wire or ribbon is insulated electrically from said plates by the interposed layers, e, e'. We prefer to employ mica as the material for the core, d, and for the insulating layers, e, e', for the reason that this material may be used in very thin layers which, while they are efficient in electrically insulating the winding of the resistance coil, do not afford any obstruction, practically, for the transmission of heat from the said resistance wire or ribbon to the plates, b, b'. Another advantage of the construction is that the electrical heater is very compact, and takes up a very small amount of room between the plates of the metallic mass.

We may employ any desired number of the electrically heated units, A, according to the desired capacity of the vaporizer, and the area of the surfaces to be presented thereby for contact with the liquid combustible. As shown in Fig. 2, we employ four units, but the number may be decreased or increased at will. The units are coupled in spaced order by any suitable or preferred means, and in the example shown in Figs. 1 and 2, said units are threaded on bolts, B, the latter passing through the units near the corners thereof, although this is not essential. Furthermore, the units may be of any desired shape and size, and it is to be understood that we do not restrict ourselves to the use of the oblong units shown in Figs. 1 and 2.

The units of the vaporizer are adapted to be supported or mounted in a suitable way so as to be in the path of a liquid combustible. The vaporizer shown in Figs. 1 and 2 is supported or carried on a base, C, consisting of two members adapted to be arranged at the respective ends of the vaporizer and to be fastened to the units, A, by certain of the bolts, B, the parts of said base, C, being secured fixedly in place by screws, c'. It is evident, however, that the particular means for supporting the parts of the vaporizer may be modified or changed within wide limits.

Our starting vaporizer is adapted for use in connection with any type of internal combustion engine, but in Figs. 1 and 2 we have shown said vaporizer in connection with an engine which is operated by the ignition of combustible charges of kerosene. The engine cylinder is indicated by the reference character D, one end of said cylinder being closed by a water jacketed head, E, the latter being provided with a seat for a valve, F. This valve may be operated mechanically by connections with a moving part of the engine in a manner well understood by those skilled in the art, but as shown, the valve is closed on its seat by the action of a spring, f, said valve being unseated by the suction created in the piston cylinder by the movement of the piston therein. On the cylinder head, E, is mounted a casing, G, which provides a mixing chamber, g, and this casing is formed at one end with an air inlet, H, the area of which is regulated by a suitable valve, h. Between the mixing chamber, g, and the air chamber of the inlet, H, is a diaphragm, I, composed preferably of metallic gauze. A jet nozzle, J, is coupled to the casing, G, at a point opposite to the diaphragm, and this nozzle is adapted to supply, at intervals, a jet of combustible liquid, the latter being forced across the chamber, g, so as to strike against the diaphragm, I, thereby breaking up the jet of liquid combustible into a spray. It is evident, however, that the diaphragm, I, may be omitted, and that the liquid combustible may be caused to impinge directly on the heated surfaces of the units, A, forming our new vaporizer.

In the example shown in Figs. 1 and 2 the multiple unit vaporizer is arranged in the air inlet, H, and opposite to the jet nozzle, J, but this particular location is not essential for the reason that said vaporizer may occupy other positions in the engine. The vaporizer located as shown, however, is well adapted for use for the reason that the jet of liquid combustible is adapted to be thrown directly against the surfaces of, and between, the units, A, and furthermore, said vaporizer is in the path of the inflowing air admitted by the regulator, h, whereby the air is commingled with the vapor and is adapted to be drawn into the piston cylinder when the valve, F, is opened.

Suitable means are provided for supplying an electric current to the resistance coils of the units, A. The units may be connected in series or in parallel, but in Fig. 2 we have shown said units included in multiple in an electric circuit, K. One of the conductors, k, passes through a bushing, l, and it has a series of branch connections with the resistance windings, c, of the units, A. From said resistance windings extend the conductors, m, which are carried through suitable insulating bushings, o, attached to the casing, said conductors, m, terminating in switch contact, p. The other conductor, k', of the circuit has a series of branches, k², corresponding to the conductors, m, and these branches, k², are connected individually to switches, L, the latter being adapted to engage with the switch contacts, p.

The described construction enables any one or more of the units, A, to be included in the electric circuit, K, by the simple adjustment of the switch or switches, L, into engagement with contacts, p, and provision is thus made for controlling at will the number of units, A, which are to be heated by the admission of the electric current to the resistance windings thereof.

The operation of the invention will be readily understood from the foregoing description taken in connection with the drawings. One source of difficulty in starting a kerosene oil engine is a tendency of the oil to condense by contact with the cold surfaces of the cylinder. This objection is overcome by electrically heating any desired number of the units, A, before starting the engine. The proper number of switches, L, are operated to close the circuit through the units of the vaporizer, and when current is admitted to the resistance windings, the heat developed therein is communicated directly to the masses of metal of the units, A, whereby the vaporizer may be brought quickly to the temperature required to convert the liquid into vapor. When the vaporizer is heated, the oil pump is started by cranking the engine, and a number of successive jets of liquid is forced from the nozzle through the chamber, $g$, into contact with the diaphragm, I, and with the hot surfaces of the vaporizer units, A. The operation of cranking the engine before mentioned operates the piston and opens the valve, F, thus creating a suction through the chamber, $g$, and drawing air through the intake, H. The air is mixed with the vapor due to the contact of the liquid combustible with the units of the vaporizer, and this mixture of air and vapor is drawn into the cylinder so as to be exploded by the operation of the igniter, M. When the engine is in running order the casing, G, is heated by the cylinder, D, and the current is switched off from the starting vaporizer, the latter remaining idle during the operation of the engine.

Having thus fully described the invention, what we claim as new, and desire to secure by Letters Patent is:

1. In a device of the class described, a vaporizing chamber adapted to communicate with an engine cylinder, means for admitting air to said chamber, means for supplying a liquid combustible to the chamber, and a plurality of vaporizing units positioned within said vaporizing chamber and opposite to the air inlet thereto, said liquid combustible supply means being positioned to direct the liquid combustible between, and against, the surfaces of said vaporizing units, and electrical means for heating said vaporizing units individually or collectively.

2. An engine-starting vaporizer comprising a vaporizing chamber, a plurality of vaporizing units positioned within said chamber and spaced relatively to each other for the purpose of securing a circulation of air and liquid fuel between them, each unit being composed of a mass of heat-absorbing metal and an electrically-operated heater incased in said mass, the metallic mass presenting an imperforate and heatable vaporizing surface, and means whereby an electric current may be admitted separately to the resistances of said vaporizing units or collectively thereto.

3. In a device of the class described, a vaporizing chamber having an air inlet and a fuel inlet, a plurality of spaced vaporizing units which are located within said chamber and in the path of the air and a liquid combustible adapted to be supplied thereto, each vaporizing unit being composed of a mass of heat-absorbing metal and an electrical resistance incased in said metallic mass, the metallic mass of each unit presenting a heatable vaporizing surface, and electrical means for heating the vaporizing units individually or collectively.

4. A vaporizer comprising a vaporizing chamber, a plurality of vaporizing units positioned within said chamber and spaced with relation to each other for the circulation of a combustible vapor between them, the individual vaporizing units being provided with means for electrically heating the same, means for supplying to said chamber a liquid combustible, and means for regulating an electric current to the vaporizing units individually or collectively.

5. An engine starting vaporizer comprising a vaporizing chamber, a plurality of vaporizing units positioned within said chamber and disposed out of engagement with each other, the individual vaporizing units being each provided with an incased electrical resistance, and means for supplying electric current to resistances of said vaporizing units collectively or individually.

6. An engine-starting vaporizer comprising a vaporizing chamber, a plurality of vaporizing units disposed within the chamber and arranged out of engagement with each other to produce intermediate spaces for the circulation between them of a liquid combustible, and electrical means whereby said vaporizer units may be heated individually or collectively.

7. An engine-starting vaporizer comprising a vaporizing chamber having an air inlet, means for supplying a liquid combustible to said chamber, a plurality of electrically heated vaporizing units within said chamber and opposite to the air inlet thereto, said vaporizing units being arranged out of engagement with each other to produce intermediate spaces whereby a combustible vapor may circulate between them, and means for supplying an electrical current individually or collectively to said units.

8. An engine-starting vaporizer comprising a vaporizing chamber, a plurality of independent vaporizing units positioned within said chamber and arranged out of engagement with each other to produce intermediate spaces for the circulation between them of a gaseous current, electrical means for individually or collectively heating the vaporizing units, and means whereby a spray of liquid combustible is caused to pass between said units and to impinge the surfaces thereof.

9. In a device of the class described, a chamber having valved communication with an engine-cylinder, means whereby air and a liquid combustible are supplied to said chamber, a plurality of vaporizing units within said chamber and arranged out of engagement with each other to produce spaces through which the air and the liquid combustible may circulate, each unit having a heat-absorbing element which is exposed for contact with the liquid combustible, and means for supplying electric current to the vaporizing units collectively or individually.

10. In a device of the class described, a chamber having an air inlet, a plurality of electrically-heated vaporizing units which are spaced relative to each other, thereby producing spaces for the circulation of air and a liquid combustible between said units, means for projecting a liquid combustible into contact with said units, each unit having a heat-absorbing member which is exposed for contact with the liquid combustible, and means for supplying electric current to the vaporizing units collectively or individually.

11. In a device of the class described, an electric circuit, a vaporizing chamber, a plurality of vaporizing units positioned within the chamber and included in multiple in said circuit, said units being spaced for the circulation between them of a liquid combustible, means whereby the units may be individually cut into and out of said circuit, and means for supplying a liquid combustible to said chamber.

12. In a device of the class described, a chamber having means for admitting air thereto, a plurality of vaporizing units positioned within the chamber and arranged in the path of the air admitted to said chamber, said units being spaced for the circulation between them of the air, means whereby a liquid combustible is brought into contact with the surfaces of said units, and electrical means for heating the vaporizing units severally or collectively.

13. In a device of the class described, a vaporizing chamber, a plurality of parallel vaporizing units separated from each other and producing spaces for the circulation of a liquid combustible between them, means for supporting said units within said chamber, means for spraying a liquid combustible against the units, and electrical means for heating the vaporizing units collectively or individually.

14. In a device of the class described, a chamber having an air inlet, a plurality of vaporizing units supported in said chamber adjacent to the air inlet, whereby air is free to circulate between and in contact with the surfaces of said units, means for spraying a liquid combustible into said chamber and into contact with the surfaces of said units, and electrical means for heating the vaporizing units collectively or individually.

15. In a device of the class described, a vaporizing chamber, a plurality of parallel vaporizing units positioned within the chamber and relatively spaced therein for the circulation of a liquid combustible between them, each unit being composed of a mass of heat-absorbing metal and an electrical resistance incased in said metallic mass, means whereby an electrical current may be supplied individually or collectively to said units, and means for supplying a liquid combustible to said chamber.

16. In a device of the class described, a vaporizing chamber, a plurality of vaporizing units within said chamber, means for spacing said units in substantially parallel relation, whereby the surfaces of the individual units are exposed for contact with a liquid combustible which is to be converted into a gaseous explosive medium, and electrical means for heating the vaporizing units collectively or individually.

17. In a device of the class described, a vaporizing chamber, a plurality of vaporizing units positioned within said chamber, each unit being composed of a mass of heat-absorbing metal and an electrical resistance incased within said mass, means for spacing said units in substantially parallel relation, whereby the surfaces of the individual units are exposed for contact with the mediums to be vaporized and heated, and electrical means for heating the vaporizing units collectively or individually.

18. In a device of the class described, a vaporizing chamber having air and fuel inlets, a plurality of vaporizing units each composed of a mass of heat-absorbing metal and an electrical resistance incased within said mass, means for spacing said units in substantially parallel relation to each other and within said chamber, whereby the surfaces of the individual units are exposed for contact with the mediums to be vaporized and heated, and means whereby an electrical current may be supplied to the resistances of said units individually or collectively.

In testimony whereof we have signed our names to this specification in the presence of two subscribing witnesses:

HARRY HERTZBERG.
ABBOT A. LOW.

Witnesses:
  Geo. Welling Giddings,
  M. A. Warren.